(12) United States Patent
Song et al.

(10) Patent No.: US 10,147,915 B2
(45) Date of Patent: Dec. 4, 2018

(54) FLEXIBLE RECHARGEABLE BATTERY

(71) Applicant: SAMSUNG SDI CO., LTD., Yongin-si, Gyeonggi-do (KR)

(72) Inventors: Hyun-Hwa Song, Yongin-si (KR); Jun-Won Suh, Yongin-si (KR); Jan-Dee Kim, Yongin-si (KR); Jung-Gyu Nam, Yongin-si (KR); Jeong-Doo Yi, Yongin-si (KR); Bong-Kyoung Park, Yongin-si (KR); Jung-Yup Yang, Yongin-si (KR); Ju-Hyeong Han, Yongin-si (KR); Ju-Hee Sohn, Yongin-si (KR); Hye-Ri Eom, Yongin-si (KR); Da-Woon Han, Yongin-si (KR); Sol Choi, Yongin-si (KR); Seok-Hun Hong, Yongin-si (KR)

(73) Assignee: SAMSUNG SDI CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/347,212

(22) Filed: Nov. 9, 2016

(65) Prior Publication Data

US 2017/0155100 A1 Jun. 1, 2017

(30) Foreign Application Priority Data

Nov. 30, 2015 (KR) ........................ 10-2015-0169375

(51) Int. Cl.
*H01M 2/02* (2006.01)
*H01M 2/08* (2006.01)
(Continued)

(52) U.S. Cl.
CPC ....... *H01M 2/0275* (2013.01); *H01M 2/0287* (2013.01); *H01M 2/08* (2013.01);
(Continued)

(58) Field of Classification Search
CPC .... H01M 2/0275; H01M 2/0287; H01M 2/08; H01M 4/667; H01M 4/668; H01M 10/0585
See application file for complete search history.

(56) References Cited

U.S. PATENT DOCUMENTS 4,621,035 A 11/1986 Bruder
5,989,751 A 11/1999 Cotte et al.
(Continued)

FOREIGN PATENT DOCUMENTS

KR 2003-0033214 A 5/2003
KR 10-2008-0056644 A 6/2008
(Continued)

OTHER PUBLICATIONS

European Search Report dated Feb. 3, 2017, of the corresponding European Patent Application No. 16201226.4.
(Continued)

*Primary Examiner* — Brittany L Raymond
(74) *Attorney, Agent, or Firm* — Lee & Morse, P.C.

(57) ABSTRACT

A battery includes a conductive substrate, the conductive substrate including a first resin layer, a barrier layer, a second resin layer, a first electrode current collector layer, and a first electrode coating layer that are sequentially stacked inward from an outermost side of the battery, an exterior member disposed to face the conductive substrate, a sealing portion formed at edges of the conductive substrate and the exterior member, and at least one second inner electrode positioned between the conductive substrate and the exterior member and stacked using a separator as a border.

14 Claims, 9 Drawing Sheets

(51) Int. Cl.
H01M 4/66 (2006.01)
H01M 10/0585 (2010.01)

(52) U.S. Cl.
CPC ........... H01M 4/667 (2013.01); H01M 4/668 (2013.01); *H01M 10/0585* (2013.01)

(56) References Cited

U.S. PATENT DOCUMENTS

| | | |
|---|---|---|
| 8,974,945 B2 | 3/2015 | Yang |
| 2008/0145750 A1 | 6/2008 | Yang |
| 2011/0133574 A1 | 6/2011 | Nitsche et al. |
| 2011/0217570 A1 | 9/2011 | Yang |
| 2013/0029205 A1* | 1/2013 | Adams .................... B32B 27/08 429/160 |
| 2013/0089774 A1 | 4/2013 | Chami |
| 2013/0130091 A1 | 5/2013 | Yang |
| 2013/0309547 A1* | 11/2013 | Bazzarella .......... H01M 2/1653 429/136 |
| 2014/0147731 A1* | 5/2014 | Anastas .............. H01M 2/1653 429/163 |

FOREIGN PATENT DOCUMENTS

| | | |
|---|---|---|
| KR | 10-2014-0123393 A | 10/2014 |
| KR | 10-2015-0058957 A | 5/2015 |

OTHER PUBLICATIONS

European Office Action dated Feb. 7, 2018, of the corresponding European Patent Application No. 16201226.4.
European Office Action dated Oct. 17, 2018, of the corresponding European Patent Application No. 16201226.4.

* cited by examiner

FLEXIBLE RECHARGEABLE BATTERY

CROSS-REFERENCE TO RELATED APPLICATION

Korean Patent Application No. 10-2015-0169375, filed on Nov. 30, 2015, in the Korean Intellectual Property Office, and entitled: "Flexible Rechargeable Battery," is incorporated by reference herein in its entirety.

BACKGROUND

1. Field

Embodiments relate to a battery, for example, a flexible rechargeable battery.

2. Description of the Related Art

A battery may manufactured by inserting an electrode assembly, which is formed by alternately stacking a positive electrode and a negative electrode while interposing a separator therebetween, into a pouch, and then sealing the pouch. However, such an approach may not be ideal for a battery such as a flexible rechargeable battery.

The above information disclosed in this Background section is only to enhance the understanding of the background of the disclosure, and therefore it may contain information that does not form the prior art that is already known in this country to a person of ordinary skill in the art.

SUMMARY

Embodiments are directed to a battery, including a conductive substrate, the conductive substrate including a first resin layer, a barrier layer, a second resin layer, a first electrode current collector layer, and a first electrode coating layer that are sequentially stacked inward from an outermost side of the battery, an exterior member disposed to face the conductive substrate, a sealing portion formed at edges of the conductive substrate and the exterior member, and at least one second inner electrode positioned between the conductive substrate and the exterior member and stacked using a separator as a border.

The at least one second inner electrode and at least one first inner electrode may be alternately stacked using the separator as a border.

The second resin layer may include a plurality of conducting portions.

The sealing portion may be formed on edges of the first electrode current collector layer and the exterior member.

The sealing portion may be formed on edges of the second resin layer and the exterior member.

The sealing portion may be formed on edges of the barrier layer and the exterior member.

The sealing portion may be formed on edges of the first resin layer and the exterior member.

At least one of the first resin layer and the second resin layer may include one or more of polyimide (PI), polyetheretherketone (PEEK), polyethersulfone (PES), polyetherimide (PEI), polycarbonate (PC), or polyethylene terephthalate (PET).

The first resin layer and the second resin layer may be made of the same material.

The barrier layer may be made of a conductive metal.

The sealing portion may be formed of a material having the same heat expansion rate as that of at least one of the first resin layer and the second resin layer.

The exterior member may be a second conductive substrate.

The battery may further include a circuit film layer stacked on an external surface of the conductive substrate.

Embodiments are also directed to a battery pack including the battery according to an embodiment as a flexible rechargeable unit battery.

Embodiments are also directed to a device including the battery pack according to an embodiment as a power supply.

Embodiments are also directed to an electronic device including a battery according to an embodiment.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

In addition, unless explicitly described to the contrary, the word "comprise" and variations such as "comprises" or "comprising" will be understood to imply the inclusion of stated elements but not the exclusion of any other elements.

Figure 1:
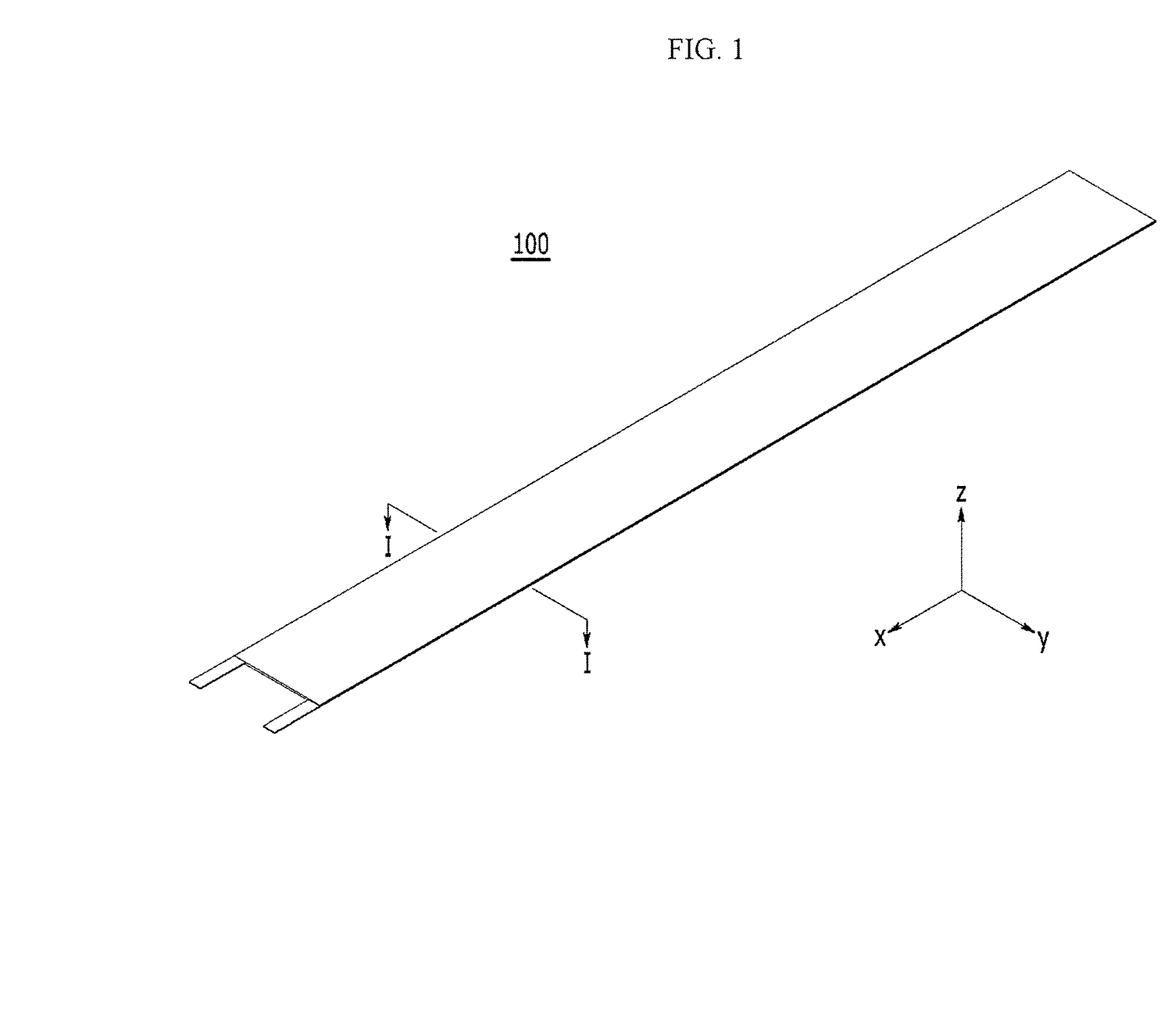
FIG. 1 illustrates a perspective view of a flexible rechargeable battery according to an example embodiment.
Figure 2:
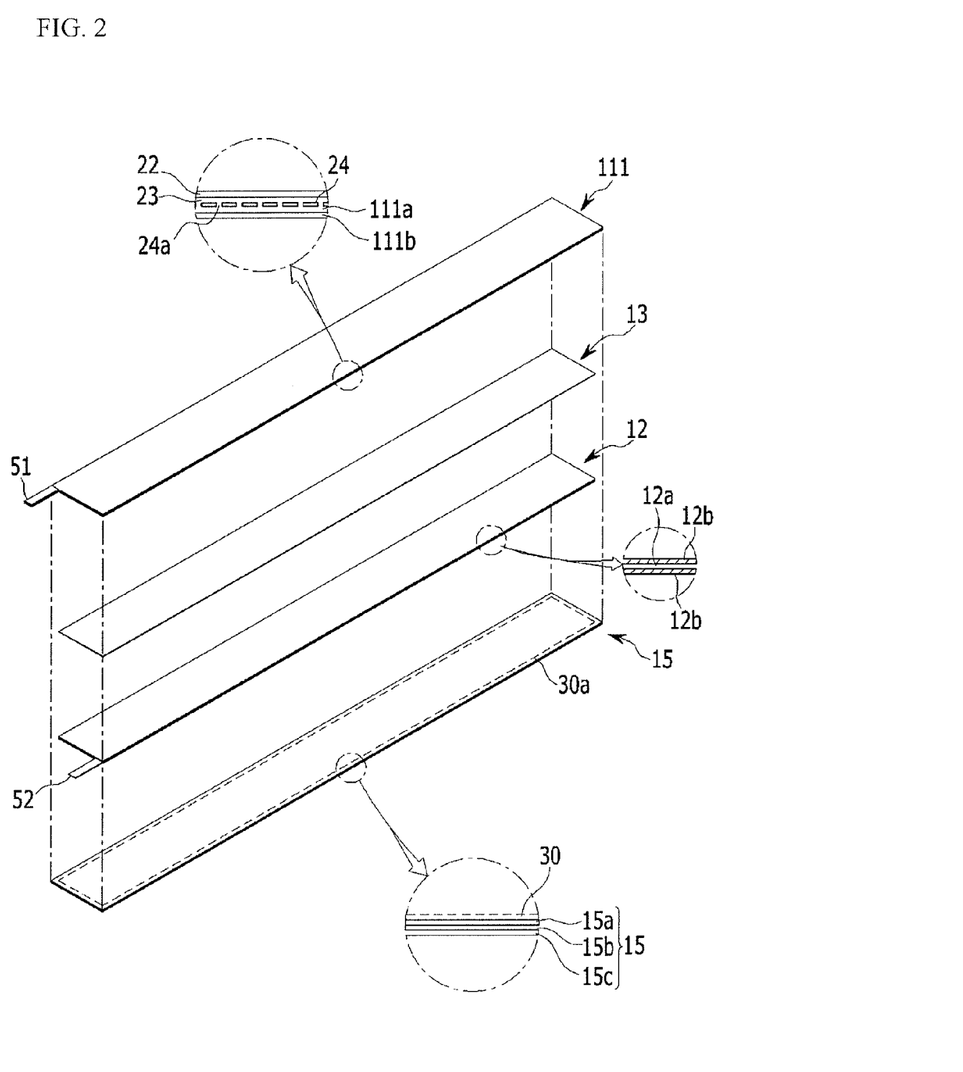
FIG. 2 illustrates an exploded perspective view of the flexible rechargeable battery component according to FIG. 1.
Figure 3:
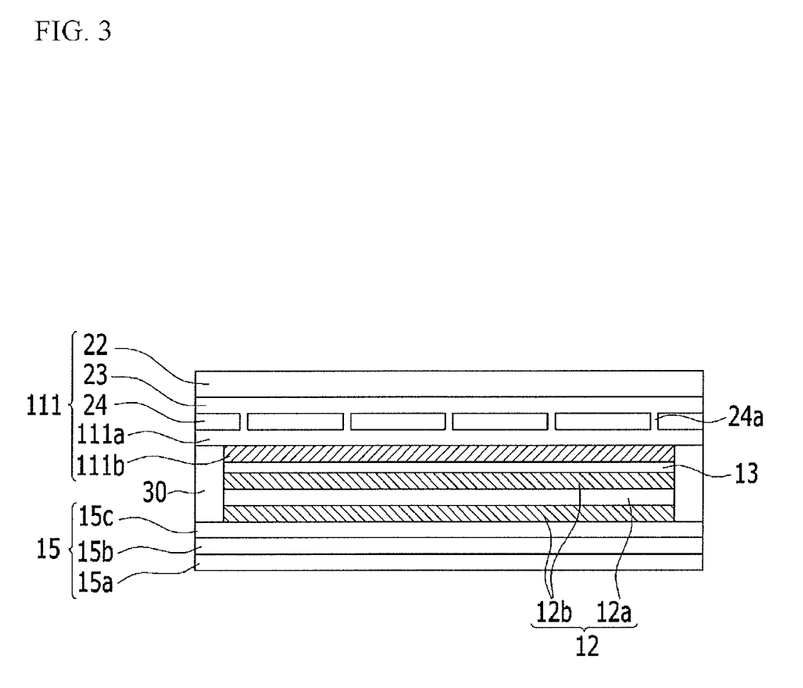
FIG. 3 illustrates a cross-sectional view of FIG. 1 taken along the line I-I.

FIG. 1 is a perspective view of a flexible rechargeable battery according to an example embodiment, FIG. 2 is an exploded perspective view of the flexible rechargeable battery according to FIG. 1, and FIG. 3 is a cross-sectional view of FIG. 1 taken along the line I-I.

Referring to FIGS. 1 to 3, the flexible rechargeable battery 100 according to the current example embodiment includes a conductive substrate 111 and an exterior member 15 that face each other. The conductive substrate 111 and the exterior member 15 are attached via a sealing portion 30 that is formed at edges of the conductive substrate 111 and the exterior member 15.

Referring to FIG. 2, at least one second inner electrode 12 stacked using a separator 13 as a border may be positioned between the conductive substrate 111 and the exterior member 15.

Figure 4:
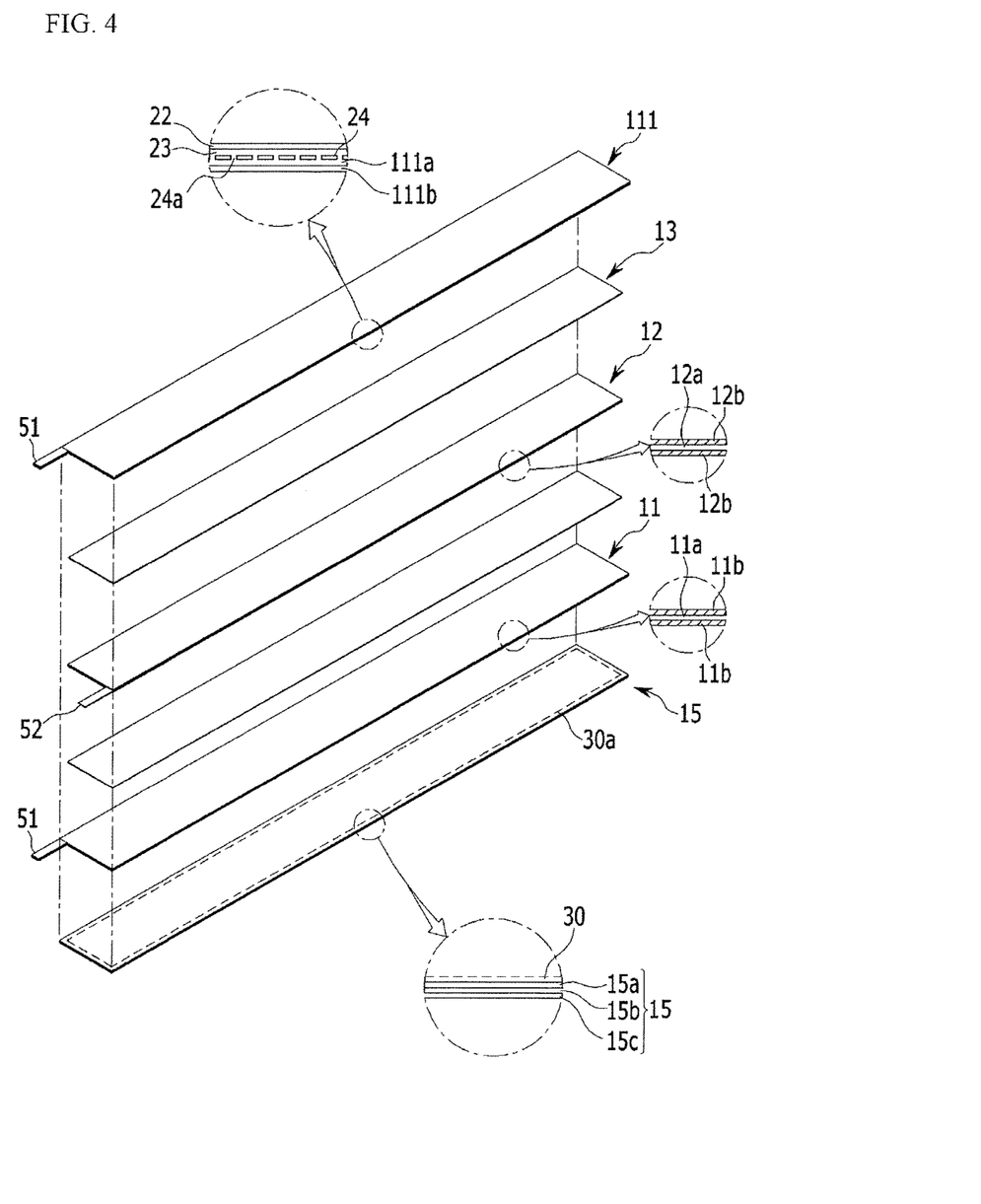
FIG. 4 illustrates an exploded perspective view of a flexible rechargeable battery according to another example embodiment.

FIG. 4 is an exploded perspective view of a flexible rechargeable battery according to another example embodiment.

In an embodiment, as shown in FIG. 4, an electrode assembly, in which at least one second inner electrode 12 and at least one first inner electrode 11 are alternately stacked by interposing a separator 13 therebetween, may be positioned between the conductive substrate 111 and the exterior member 15.

The second inner electrode 12 may be a positive electrode, and may include a second inner electrode current collector layer 12a and a second inner electrode coating layer 12b formed on the second inner electrode current collector layer 12a. In the current example embodiment, an uncoated region, where the second inner electrode coating layer 12b is not formed, exists at one end of the second inner electrode current collector layer 12a, and a second electrode tab 52 may be connected to the uncoated region.

The second inner electrode current collector layer 12a may be formed of, for example, a polymer substrate that is coated with an aluminum foil, a nickel foil, a stainless steel foil, a titanium foil, a nickel foam, a copper foam, a conductive metal, or a combination thereof, etc.

The second inner electrode coating layer 12b may be formed at one surface or opposite surfaces of the second inner electrode current collector layer 12a using a composition including a positive electrode active material. The positive electrode active material may be a compound that can reversibly intercalate and deintercalate lithium ions (a lithiated intercalation compound), for example. The composition for forming the second inner electrode coating layer 12b may include the positive electrode active material and one or more of a binder, a conductive material, or a viscosity agent.

The first inner electrode 11 positioned between the conductive substrate 111 and the exterior member 15 may be a negative electrode, and may include a first inner electrode current collector layer 11a and a first inner electrode coating layer 11b formed on the first inner electrode current collector layer 11a.

The first inner electrode current collector layer 11a may be formed of, for example, a polymer substrate that is coated with a copper foil, a nickel foil, a stainless steel foil, a titanium foil, a nickel foam, a copper foam, a conductive metal, or a combination thereof, etc.

The first inner electrode coating layer 11b may be formed at one surface or opposite surfaces of the first inner electrode current collector layer 11a using a composition including a negative electrode active material. The negative electrode active material layer may include a material that can reversibly intercalate/deintercalate lithium ions, a lithium metal, a lithium metal alloy, a material that can dope and dedope lithium, or a transition metal oxide, for example. The composition for forming the first inner electrode coating layer 11b may include the negative electrode active material and one or more of a binder, a conductive material, or a viscosity agent.

A suitable separator 13 that can separate the positive electrode 11 from the negative electrode 12 and provide a moving path of lithium ions may be used. For example, a separator having low resistance for ion movement of an electrolyte and an excellent capability of containing an electrolyte solution may be used. For example, the separator may be one selected from a glass fiber, polyester, Teflon, polyethylene, polypropylene, polytetrafluoroethylene (PTFE), or a combination thereof, and may also be a non-woven fabric or a woven fabric. For example, in lithium ion batteries, a separator made of a polyolefin-based polymer such as polyethylene, polypropylene, or the like may be used, a separator coated with a material including a ceramic component or a polymer material may be used to achieve heat resistance or mechanical strength, and the separator having a single- or multi-layered structure may be used.

The conductive substrate 111 may include, for example, a first resin layer 22, a barrier layer 23, a second resin layer 24, a first electrode current collector layer 111a, and a first electrode coating layer 111b that are sequentially stacked inward from an outermost side of the rechargeable battery.

The conductive substrate 111 may serve as both the electrode and an exterior member. Thus, an additional exterior member may be omitted at a side where the conductive substrate 111 is stacked. Accordingly, compared with a general rechargeable batteries, the rechargeable battery according to the current example embodiment may have a thickness that is significantly reduced while occupying the same area and having the same battery capacity. In addition, a force applied to the rechargeable battery when it is bent or folded may be significantly reduced, and stability may be maintained even if compressive stress and tensile stress are repeatedly applied to the rechargeable battery.

In the current example embodiment, the conductive substrate 111 serving as the electrode may serve as a positive electrode or a negative electrode, and if the conductive substrate 111 serves as the negative electrode, the second inner electrode 12, i.e., the positive electrode, may be stacked between the conductive substrate 111 and the exterior member 15. If the conductive substrate 111 serves as the positive electrode, the first inner electrode 11, i.e., the negative electrode, may be stacked between the conductive substrate 111 and the exterior member 15. Accordingly, in the flexible rechargeable battery of the present disclosure, the conductive substrate 111 is not specifically limited to any polarities. In another implementation, as described above, a plurality of first inner electrodes 11 and a plurality of second inner electrodes 12 may also be alternately stacked while interposing the separator 13 therebetween.

The conductive substrate 111 may include the first resin layer 22 and the second resin layer 24 that are made of a polymer resin. Thus, the rechargeable battery according to the current example embodiment may provide superior flexibility.

The first resin layer 22 and/or the second resin layer 24 may be made of one or more of, for example, polyimide (PI), polyetheretherketone (PEEK), polyethersulfone (PES), polyetherimide (PEI), polycarbonate (PC), or polyethylene terephthalate (PET).

The first resin layer 22 and the second resin layer 24 may be made of different materials. In another implementation, the first resin layer 22 and the second resin layer 24 may be made of the same material, which may provide advantages such as easier stacking thereof and no specific changes made to conditions of the process.

The barrier layer 23 may be formed between the first resin layer 22 and the second resin layer 24. The barrier layer 23 may be made of, for example, a conductive metal. The barrier layer 23 may prevent external moisture and the like from permeating into the rechargeable battery.

In the current example embodiment, the conductive metal may include one or more of, for example, copper, aluminum, nickel, or stainless steel. The barrier layer 23 may be made of the same material as or a different material from the first electrode current collector layer, for example.

In another implementation, the barrier layer 23 may be formed by, for example, forming a metal coating layer at one surface of the first resin layer 22 or by attaching a metal foil to the surface thereof, etc.

In an embodiment, the second resin layer 24 may have a porous structure in which a plurality of pores are formed. The porous structure may form a conducting portion 24a that allows electrical conduction between the barrier layer 23 and the first electrode current collector layer 111a, as described in further detail below. As described above, when the conducting portion 24a is included in the second resin layer 24, a first electrode tab 51 may be attached to the first electrode current collector and/or the barrier layer 23.

The first electrode current collector layer 111a may be formed in the second resin layer 24. The first electrode current collector layer 111a may be formed of, for example, the same material as the first inner electrode current collector layer and/or the second inner electrode current collector layer, or a different material therefrom.

The first electrode current collector layer 111a may be made of, for example, one or more of aluminum, copper, nickel, aluminum, stainless steel, titanium, or an alloy thereof, or may be made of one or more surfaces of aluminum, copper, or stainless steel, which may be surface-treated with carbon, nickel, titanium, silver, etc., etc.

In another implementation, the first electrode current collector layer 111a may be made in the form of a mesh, or in the form of a metal foil, a metal foam, a metal fiber, or a metal rubber.

The first electrode coating layer 111b may be formed on the first electrode current collector layer 111a. The first electrode coating layer 111b may be formed of the same material as the material for forming the first inner electrode coating layer and/or the second inner electrode coating layer described above, or a different material therefrom, for example.

The first electrode coating layer 111b may be formed of, for example, a carbon material such as crystalline carbon, amorphous carbon, a carbon composite, a carbon fiber, etc., a lithium metal, or at least one of a metal oxide and a lithium alloy, etc.

Next, the exterior member 15 will be described. The exterior member 15 may have a structure in which an outer resin layer 15a, a metal layer 15b, and an inner resin layer 15c are sequentially stacked.

The outer resin layer 15a may serve as a substrate and a protective layer. The outer resin layer may be formed of, for example, one or more of polyethylene terephthalate, polybutylene terephthalate, polyethylene naphthalate, polybutylene naphthalate, a polyester copolymer, polycarbonate, or a nylon film, etc.

The metal layer 15b may help to prevent permeation of moisture and the like.

The metal layer 15b may be made of, for example, one or more of an alloy of iron (Fe), carbon (C), chromium (Cr), and manganese (Mn), iron (Fe), an alloy of iron (Fe), carbon (C), chromium (Cr), and nickel (Ni), copper (Cu), aluminum (Al), or an equivalent thereof, etc.

The metal layer 15b may be formed to be thick in order to help prevent moisture permeation and the like as long as flexibility of the flexible rechargeable battery 100 is not deteriorated.

The inner resin layer 15c helps to adhere the separator 13 or the second inner electrode 12 to the exterior member 15. The inner resin layer may be formed of, for example, a polyolefin or a copolymer of a polyolefin. The polyolefin may be made of polyethylene (PE) or polypropylene (PP), etc.

As described above, the conductive substrate 111 may have a multi-layered structure serving as the positive electrode and/or the negative electrode as well as the exterior member. Thus, the flexible rechargeable battery 100 may be prevented from being broken due to repeated bending or folding, and may achieve a thinner thickness while occupying the same area and having the same capacity since an additional exterior member may be omitted in the layer where the conductive substrate 111 is stacked.

Next, the sealing portion 30 will be described. FIG. 3 and FIGS. 5 to 7 are various illustrative cross-sectional views of flexible rechargeable batteries 100 with sealing portions 30 having different structures according to the present disclosure.

Referring first to FIG. 3, in the flexible rechargeable battery according to the present disclosure, the sealing portion 30 may be formed on edges of the first electrode current collector layer 111a and the exterior member 15.

In the example embodiment illustrated in FIG. 3, a horizontal cross-sectional area of the first electrode coating layer 111b, i.e., a cross-sectional area in a direction perpendicular to a thickness direction of the flexible rechargeable battery (area in the x-y plane), is smaller than a horizontal cross-sectional area of the first electrode current collector layer 111a.

In addition, sealing regions 30a of the same size are respectively present at edges of surfaces of the exterior member 15 and the first electrode current collector layer 111a facing each other, and the sealing portion 30 is formed thereat to seal a conductive substrate 111 and the exterior member 15.

Figure 5:
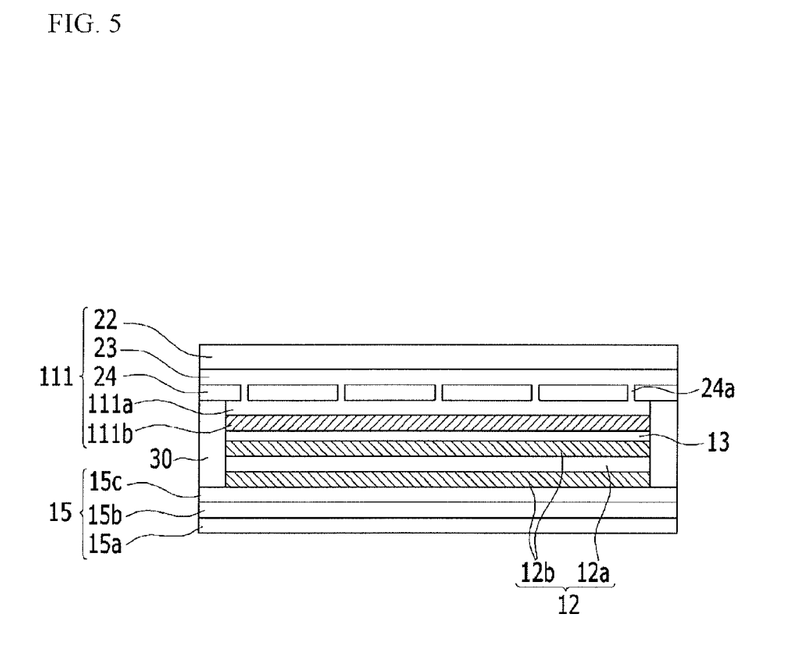
FIGS. 5 to 9 illustrate cross-sectional views of components of flexible rechargeable batteries according to other example embodiments, respectively.

As another example, in the flexible rechargeable battery according to the present disclosure, a sealing portion 30 may, as shown in FIG. 5, be formed on edges of a second resin layer 24 and an exterior member 15.

Accordingly, a horizontal cross-sectional area of a first electrode current collector layer 111a or a first electrode coating layer 111b, i.e., a cross-sectional area in a direction perpendicular to a thickness direction of the flexible rechargeable battery (area in the x-y plane), is smaller than a horizontal cross-sectional area of the second resin layer 24.

In addition, sealing regions 30a of the same size are present at edges of surfaces of the exterior member 15 and the second resin layer 24 facing each other, and the sealing portion 30 is formed thereat to seal a conductive substrate 111 and the exterior member 15.

Figure 6:
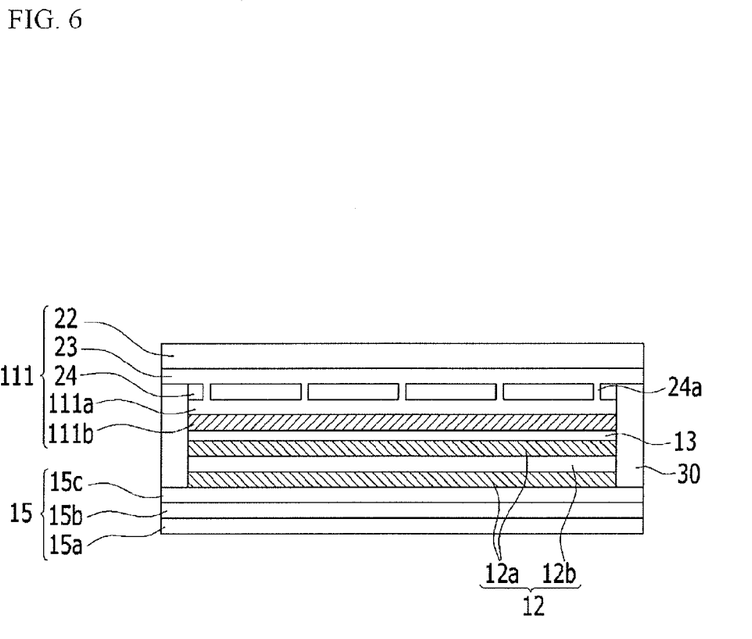

As yet another example, in the flexible rechargeable battery according to the present disclosure, a sealing portion 30 may, as shown in FIG. 6, be formed on edges of a barrier layer 23 and an exterior member 15.

Accordingly, a horizontal cross-sectional area of a first electrode current collector, a first electrode coating layer 111b, or a second resin layer 24, i.e., a cross-sectional area in a direction perpendicular to a thickness direction of the flexible rechargeable battery (area in the x-y plane), is smaller than a horizontal cross-sectional area of the barrier layer 23.

In addition, sealing regions 30a of the same size are present at edges of surfaces of the exterior member 15 and the barrier layer 23 facing each other, and the sealing portion 30 is formed thereat to seal a conductive substrate 111 and the exterior member 15.

Figure 7:
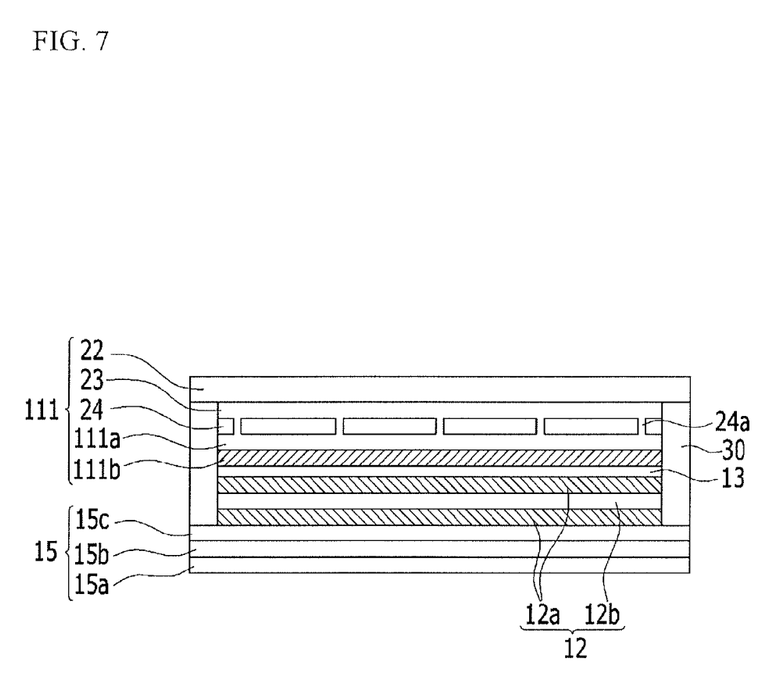

As yet another example, in the flexible rechargeable battery according to the present disclosure, a sealing portion 30 may, as shown in FIG. 7, be formed on an edge of the first resin layer 22.

Accordingly, a horizontal cross-sectional area of a first electrode current collector, a first electrode coating layer 111b, a second resin layer 24, or a barrier layer 23, i.e., a cross-sectional area in a direction perpendicular to a thickness direction of the flexible rechargeable battery (area in the x-y plane), is smaller than a horizontal cross-sectional area of the first resin layer 22.

In addition, sealing regions 30a of the same size are present at edges of surfaces of the exterior member 15 and the first resin layer 22 facing each other, and the sealing portion 30 is formed thereat to seal a conductive substrate 111 and the exterior member 15.

In the present disclosure, the sealing portion 30 may be formed by, for example, coating and curing a resin composition with adhesiveness, or by attaching an adhesive tape.

When formed using a resin, the sealing portion 30 may be formed of a material having the same heat expansion rate as the first resin layer 22 and the second resin layer 24. In the current example embodiment, dimensional stability of the flexible rechargeable battery 100 may be further improved when performing the sealing process.

Figure 8:
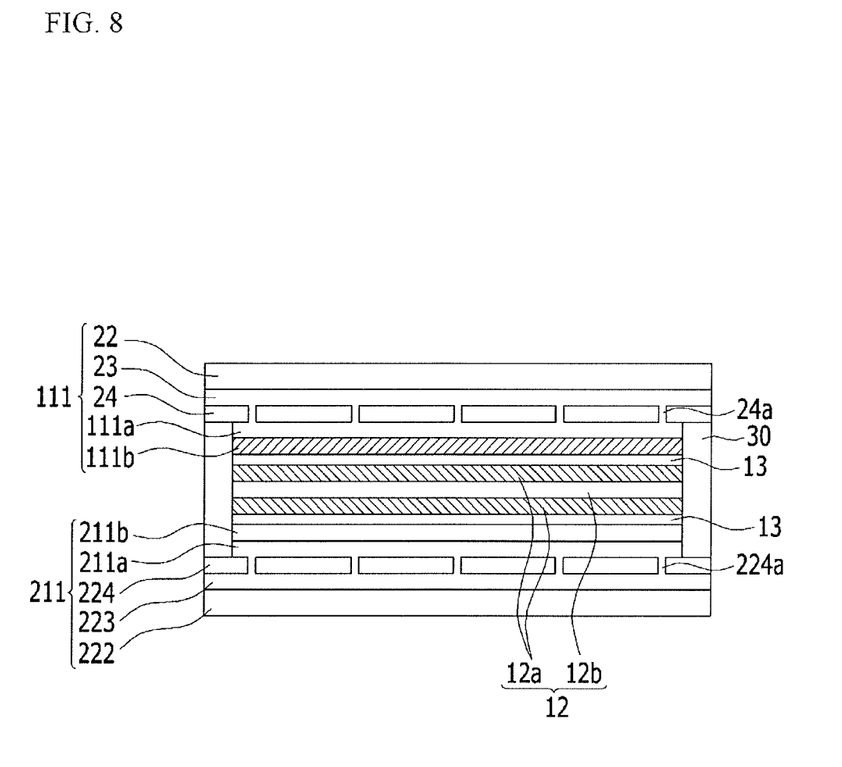

FIG. 8 illustrates a cross-sectional view of a flexible rechargeable battery 100 according to yet another example embodiment.

Referring to FIG. 8, the flexible rechargeable battery 100 may be formed by attaching a conductive substrate 211 as an exterior member. For example, the flexible rechargeable battery 100 may be formed by stacking a second inner electrode 12 between conductive substrates 111 and 211 facing each other while using separators 13 as a border. The conductive substrate 211 may include a first electrode current collector layer 211a, a first electrode coating layer 211b, a first resin layer 222, a barrier layer 223, a second resin layer 224, and a conducting portion 224a. Since each configuration included in the flexible rechargeable battery 100 having such a structure is the same as the configuration described above, description thereof will be omitted herein.

When the second inner electrode 12 is included between the conductive substrates 111 and 211 without using the exterior member, it may be advantageous in that the flexible rechargeable battery with a thinner thickness may be manufactured while realizing the same capacity with the same area.

Figure 9:
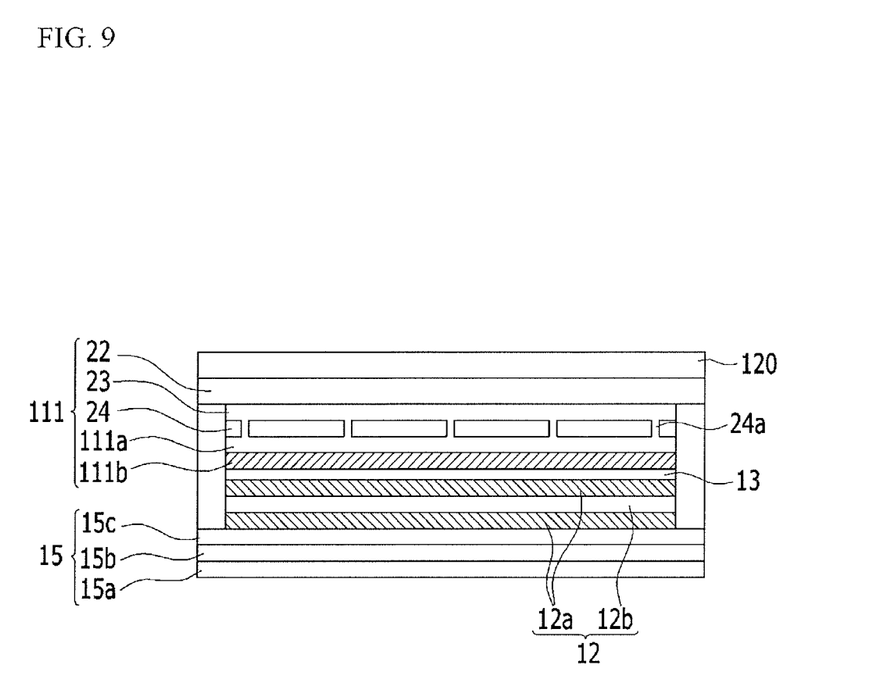

FIG. 9 illustrates a cross-sectional view of a flexible rechargeable battery 100 according to yet another example embodiment.

Referring to FIG. 9, the flexible rechargeable battery 100 may further include a circuit film layer 120 that is stacked on an external surface of a conductive substrate 111. Since each configuration included in the flexible rechargeable battery 100 having such a structure is the same as the configuration described above, description thereof will be omitted herein.

In order to implement various features for devices to which the flexible rechargeable battery 100 is applied, a circuit pattern and/or an antenna pattern may be included in the circuit film layer 120. In the current example embodiment, there may not be a need to secure an additional space for the circuit pattern and/or the antenna pattern described above in the devices to which the flexible rechargeable battery 100 is applied. Thus, a wider space may be secured by the flexible rechargeable battery 100. Accordingly, the size of the battery to be applied to the same device may be increased, and the capacity of the battery may also be increased.

In an example embodiment, a battery pack may include the flexible rechargeable battery 100 as a unit battery.

In an example embodiment, a device may include the battery pack as a power supply. The device may be, for example, an electronic device. The device may be, for example, a mobile phone, a portable computer, a smartphone, a tablet PC, a smart pad, a smartbook, an electric vehicle, a hybrid electric vehicle, a plug-in hybrid electric vehicle, and/or a power storage device, etc.

By way of summation and review, there is an interest in flexible rechargeable batteries as an energy source, for example, as technologies for flexible display devices are developed. Generally, a stacked type of battery is manufactured by inserting an electrode assembly, which is formed by alternately stacking a positive electrode and a negative electrode interposing a separator therebetween, into a pouch, and then sealing the pouch. However, when a general pouch type of battery is repeatedly bent with a constant curvature radius, it may receive compressive stress and tensile stress and may thus be damaged if not sufficiently flexible.

As described above, embodiments may provide a flexible rechargeable battery with excellent bending and folding characteristics. A flexible rechargeable battery according to an embodiment may maintain stability even if it is repeatedly bent or folded.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

100: flexible rechargeable battery
11: first inner electrode
11a: first inner electrode current collector layer
11b: first inner electrode coating layer
12: second inner electrode
12a: second inner electrode current collector layer
12b: second inner electrode coating layer
13: separator
15: exterior member
15a: outer resin layer
15b: metal layer
15c: inner resin layer
111, 211: conductive substrate
111a, 211a: first electrode current collector layer
111b, 211b: first electrode coating layer
22, 222: first resin layer
23, 223: barrier layer
24, 224: second resin layer
24a, 224a: conducting portion
30: sealing portion
30a: sealing region
51: first electrode tab
52: second electrode tab
120: circuit film layer

What is claimed is:
1. A battery, comprising:
a conductive substrate, the conductive substrate including a first resin layer, a barrier layer, a second resin layer, a first electrode current collector layer, and a first electrode coating layer that are sequentially stacked inward from an outermost side of the battery;
an exterior member disposed to face the conductive substrate;

a sealing portion formed at edges of the conductive substrate and the exterior member; and at least one second inner electrode positioned between the conductive substrate and the exterior member and stacked using a separator as a border, wherein:

the barrier layer is made of a conductive metal, and the second resin layer includes a plurality of conducting portions.

2. The battery as claimed in claim 1, further comprising at least one first inner electrode, wherein the at least one second inner electrode and the at least one first inner electrode are alternately stacked using the separator as a border.

3. The battery as claimed in claim 1, wherein the sealing portion is formed on edges of the first electrode current collector layer and the exterior member.

4. The battery as claimed in claim 1, wherein the sealing portion is formed on edges of the second resin layer and the exterior member.

5. The battery as claimed in claim 1, wherein the sealing portion is formed on edges of the barrier layer and the exterior member.

6. The battery as claimed in claim 1, wherein the sealing portion is formed on edges of the first resin layer and the exterior member.

7. The battery as claimed in claim 1, wherein at least one of the first resin layer and the second resin layer includes one or more of polyimide (PI), polyetheretherketone (PEEK), polyethersulfone (PES), polyetherimide (PEI), polycarbonate (PC), or polyethylene terephthalate (PET).

8. The battery as claimed in claim 7, wherein the first resin layer and the second resin layer are made of the same material.

9. The battery as claimed in claim 1, wherein the sealing portion is formed of a material having the same heat expansion rate as that of at least one of the first resin layer and the second resin layer.

10. The battery as claimed in claim 1, wherein the exterior member is a second conductive substrate.

11. The battery as claimed in claim 1, further comprising a circuit film layer stacked on an external surface of the conductive substrate.

12. A battery pack comprising the battery as claimed in claim 1 as a flexible rechargeable unit battery.

13. A device comprising the battery pack as claimed in claim 12 as a power supply.

14. An electronic device comprising a battery as claimed in claim 1.

* * * * *